United States Patent Office 3,401,203
Patented Sept. 10, 1968

3,401,203
PREPARATION OF AMINES
Eugene Kraiman, Cedar Grove, N.J., and John Austin, New York, N.Y., assignors to Sun Chemical Corporation, New York, N.Y., a corporation of Delaware
No Drawing. Filed Jan. 21, 1964, Ser. No. 339,105
11 Claims. (Cl. 260—583)

ABSTRACT OF THE DISCLOSURE

A process for producing a primary functional derivative by contacting a terminal olefin with hydrogen bromide in presence of a catalyst, reacting the terminal bromide so produced with an active hydrogen compound in presence of a base, separating the hydrogen bromide salt from the primary functional derivative produced thereby, halogenating the hydrogen bromide salt to release bromide, treating the bromide with hydrogen to form hydrogen bromide and recycling the hydrogen bromide to contact additional terminal olefin.

---

The present invention relates to a process for producing primary functional derivatives, particularly to a process for converting α-olefins to primary functional derivatives, and more particularly to a cyclic process for converting α-olefins to primary functional derivatives.

Heretofore, it was thought that primary functional derivatives such as amines, mercaptans, nitriles and the like could be prepared from the olefins by a direct reaction of the olefin with an active hydrogen compound. However, investigators have found that several of the desired primary derivatives cannot be prepared directly from the olefin as is presently known. Consequently, it was necessary to investigate new methods for the preparation of primary functional derivatives from olefins. From this investigation, it was found that most primary functional derivatives could be prepared from olefins by an indirect method. In addition to providing a method for preparing most of the primary functional derivatives desired, it was found that these derivatives could be prepared in essentially the same equipment and by essentially the same process. This feature materially adds to the economic value of the process, and also reduces the cost of additional equipment.

It was also found that primary functional derivatives, especially those derivatives which are derived from amines, could be prepared in the absence of solvents by the indirect process and the products recovered therefrom were of a higher yield and of a greater purity than heretofore prepared.

Likewise, it was found that the costly solvent recovery steps normally incurred in this type of reaction could now be eliminated, thereby providing for a more economical process. The process also eliminates the need for excess amounts of reactants in the reaction, thereby eliminating costly recovery operations. Another advantage of the indirect process over the direct process is the preparation and recovery of products which are substantially free of mixtures.

It is an object of the present invention to provide an indirect process for the preparation of primary functional derivatives.

Another object of the present invention is to provide a process for reacting terminal olefin with an active hydrogen compound.

Another object of the present invention is to provide a process for hydrobrominating a terminal olefin.

Still another object of the present invention is to provide a process for reacting a hydrobrominated hydrocarbon with an active hydrogen compound.

Still another object of the present invention is to provide a process for recovering and recycling hydrogen bromide for reuse.

A further object of the present invention is to provide a cyclic process for hydrobrominating a terminal olefin.

A still further object of the present invention is to provide a cyclic process for preparing primary functional derivatives.

Still a further object of the invention is to provide a process for producing primary functional derivatives which is practical and satisfactory and which is capable of being conducted on an industrial scale with relatively simple apparatus and equipment.

Other objects and advantages of the present invention will become apparent from the following description of a preferred procedure for carrying it into practice.

It is known that olefins can combine with hydrogen halides to form the alkyl halides, when an aqueous solution of hydrogen halide is heated with an olefin at 100° C. under pressure. Also the addition of gaseous hydrogen halides to olefins at a temperature below 300° C. occurs to a certain extent. In fact, Markownikoff stated that "if an unsymmetrical hydrocarbon combines with a halogen acid, the halogen adds to the carbon atom with the fewer hydrogen atoms, i.e., to the carbon atom which is more under the influence of other carbon atoms." Various methods have been proposed for controlling the hydrohalogenation reaction so as to form reaction products in which the hydrogen halide has been added contrary to the above Markownikoff rule. For instance, it has been proposed to effect the hydrohalogenation reaction in the presence of various peroxides, such as hydrogen peroxide, acetyl peroxide and the like, as well as of compounds of the type of oxygen, air, or ozone, all of which tend to form peroxides when contacted with unsaturated hydrocarbons to effect directional additions thereof via the so-called "abnormal" addition, i.e., contrary to the course stated or suggested by Markownikoff.

One embodiment of our invention consists of a process for producing valuable derivatives of olefinic hydrocarbons which comprises the steps of treating said olefins with hydrogen bromide to produce a terminal bromide, contacting the terminal bromide with an active hydrogen compound in the presence of a base to produce primary functional derivatives, separating the primary functional derivatives from a hydrogen bromide salt and treating the hydrogen bromide salt so formed with a halogen to release the bromine, reacting the bromine with hydrogen to produce a hydrogen bromide and thereafter recycling the recovered hydrogen bromide to the first step for reuse in the reaction with the olefins.

Olefins, preferably terminal olefins which may be treated in accordance with the present invention, may be either normally gaseous or normally liquid. The terminal olefin starting materials used in the process of the present invention has the formula

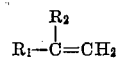

wherein $R_1$ is an aliphatic hydrocarbon preferably an alkyl group, and $R_2$ is hydrogen or an aliphatic hydrocarbon, and preferably an alkyl group. The terminal olefin contains from 6 to 40 carbon atoms per molecule, and more preferably from 6 to 20 carbon atoms per molecule. Examples of terminal olefins which may be employed are hexene, 2-ethyl-hexene, octene, decene, hexadecene, octadecene, eicosene, docosene, hexacosene and the like.

The frominated olefin formed by the reaction of an olefin with hydrogen bromide may be represented by the formula

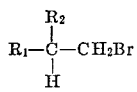

wherein $R_1$ is an aliphatic hydrocarbon, preferably an alkyl group and $R_2$ is hydrogen or an aliphatic hydrocarbon, preferably an alkyl group and may be for example, bromo-hexane, bromo-octane, bromo-decane, bromo-hexadecane, bromo-octadecane and the like.

In conducting the hydrobromination reaction, the terminal olefins are reacted with hydrogen bromide in the presence of a free radical producing catalyst such as ultra-violet light, peroxides, oxygen, air, ozone, ozonized oxygen, and ozonized air. The catalysts may be added to the hydrogen bromide gas and olefin mixture or the reaction may be conducted in the presence of oxygen or by any other convenient method. If desired, the olefin may be blown with air or oxygen to produce hydroperoxides in situ prior to admission of the hydrogen bromide gas.

The present process may be carried out in batch or continuous type operation. In the batch operation of this process, the olefin is introduced into the reactor and agitated in the presence of a peroxide type catalyst, and the hydrogen bromide is introduced below the surface of the olefin. After the olefin has been contacted with the hydrogen bromide for a suitable length of time, the agitation may be stopped and the hydrocarbon separated and fractionated to recover the desired product. In the continuous type of operation, the hydrocarbon charge stock is fed to contactors in which intimate contact between the hydrocarbon and hydrogen bromide is maintained. The effluent from the contactors is treated for the separation of the hydrogen bromide from the hydrocarbon, the hydrogen bromide being returned to the contactors and the hydrocarbon being fed to the fractionation system. The hydrocarbon stream leaving the separator contains a small amount of dissolved hydrogen bromide which may be removed by treatment with caustic, by fractionation, selected adsorbents for hydrogen bromide or by other suitable means. Hydrocarbons of high molecular weight and low hydrogen content will gradually accumulate in the catalyst and should be removed by distillation or other suitable means in order to maintain the activity of the acid at the desired level.

The proportion of olefin and hydrogen bromide used can vary over moderately wide limits depending on the relative solubility of the olefin and the hydrogen bromide in the reaction medium, and on the pressure at which the reaction is carried out. The reaction should be carried out under such conditions that the molar proportion of hydrogen bromide in solution is not substantially in excess of that of the olefin, and it is preferred to use a molar proportion of olefin to hydrogen bromide of at least 1:1.5, and more preferably in a molar ratio of 1:1.3. It is however preferred that the hydrogen bromide be in a slight molar excess over the olefin, for instance, the molar proportion of olefin to hydrogen bromide is about 1:1.2.

The volume of molecular oxygen or ozone passed through the reaction mixture may be varied within wide limits, for instance, between 0.01 to 1.0 mol of oxygen per mol of olefin feed.

In using peroxides as sources of free radicals, it is convenient to dissolve or suspend about 0.1 percent to about 2 percent of the peroxide in the olefin and then contacting this mixture with excess hydrogen bromide.

In conducting the process in a continuous manner, the gas and peroxide treated olefin are brought together continuously, for example, in a vertical glass column where hydrogen bromide gas enters at the base and peroxide treated olefin is passed down through the top. A suitable provision is provided at the bottom of the columns for removing the hydrobrominated product and at the top for venting the excess hydrogen bromide gas and any other inert gases. The excess hydrogen bromide may be recycled to the bottom of the reactor again so that actual consumption of hydrogen bromide does not appreciably exceed the amount required for saturation of the olefinic linkages.

Examples of peroxide catalysts which may be employed are for instance, peracids, aroyl peroxides, acyl peroxides, alkyl peroxides, hydro-peroxides, ketone peroxides and hydrogen peroxide. Peroxides which have been employed successfully as catalysts are lauroyl peroxide and di-tertiary butyl peroxide. Since air or oxygen are the cheapest of the catalysts and is satisfactory, it is preferred that this be employed in the reaction. The exact temperatures and pressures which should be employed will depend primarily upon the activity and physical characteristics of the hydrocarbons involved. Generally, excessive elevated temperatures are not necessary and good results are obtained below 200° C. The reaction may be carried out at any suitable temperature range, for instance, between 0 and 70° C. and more preferably, between 0 and 40° C. The reaction system may be at atmospheric or lower pressures, but it was found convenient to use atmospheric or preferably somewhat higher pressures, say from 1 to 500 p.s.i., and more preferably from 1 to 50 p.s.i. The reaction may be carried out in the presence of a solvent. However, the use of a solvent is not always necessary. Inert solvents which may be employed are hexane, heptane, octane and the like. The reaction is preferably conducted with commercially dry materials, however, traces of moisture are not objectionable.

The terminal bromide thus produced is reacted with an active hydrogen compound under the influence of heat and pressure to form a primary functional derivative and a hydrogen bromide salt. Active hydrogen compounds which may be employed in the reaction with the terminal bromides may be represented by the following formulae: $RNH_2$, $R_2NH$, $NH_3$, $RSH$, $H_2S$, $HCN$, $H_2SO_3$ and $ROH$, wherein R is an aliphatic hydrocarbon, preferably an alkyl group having from 1 to 3 carbon atoms, a cycloaliphatic hydrocarbon having at least 7 carbon atoms, an aromatic hydrogen carbon having at least 6 carbon atoms or hydroxyalkyl or ethers thereof.

The formation of the primary functional derivatives may be exemplified by the following equation:

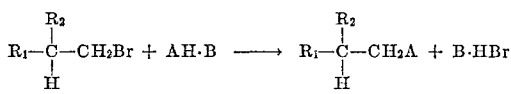

wherein $R_1$ and $R_2$ are the same as designated in the previous formula. AH is an active hydrogen group consisting of $RNH_2$, $R_2NH$, $NH_3$, $RSH$, $H_2S$, $HCN$, $H_2SO_3$ and $ROH$, wherein R is defined above, B is an inorganic or tertiary organic amine base or a selective adsorbent for the hydrogen bromide.

Examples of the active hydrogen compounds are methylamine, ethylamine, propylamine, monoethanolamine, diethanolamine, aniline, benzylamine, dimethylamine, diethylamine, dipropylamine, methylethylamine, dibenzylamine, ammonia, ethyl mercaptan, methyl mercaptan, thiophenol, hydrogen sulfide, hydrogen cyanide, sulfurous acid, methanol, ethanol, propanol, phenol and the like.

In reacting the terminal bromide with the active hydrogen compound, it is preferred that the bromide compound and the hydrogen compound be brought together in a liquid phase in the presence of a base, preferably an inorganic base and more preferably an aqueous alkali or alkaline earth metal hydroxide or carbonate, such as for example, sodium hydroxide, sodium carbonate and the like, or tertiary organic bases, i.e., trimethylamine, triethylamine and the like. The terminal bromide may also be contacted with the active hydrogen compound in the presence of a selective adsorbent material for hydrogen bromide, such as for example, alumina, activated charcoal and molecular sieves.

Hence, it will be understood that a terminal bromide is reacted with an active hydrogen compound, i.e., a primary or secondary amine, ammonia, hydrogen sulfide (or its salts), mercaptans, hydrogen cyanide (or its salts), alcohols and sulfurous acid (or its salts) in the presence of a base (when the salts are used) and water or a solvent when necessary.

When the reaction between the terminal bromide and the active hydrogen compound is complete, the solvent when employed, may be removed by distillation or by any other means known to the art. If distillation is used, it is desirably conducted under a reduced pressure in order to keep the distillation temperature low to prevent discoloration and decomposition of the product thus formed.

When water is used the reaction media separates into two phases; the upper phase containing the primary functional derivatives and the lower aqueous phase containing a hydrogen bromide salt. The upper phase is separated for distillation from the lower phase by decantation or any other means known to the art. The lower phase containing the hydrogen bromide salt is subsequently treated for bromine recovery.

Generally, the reaction is facilitated by the use of a slight amount of heat, typically practicable temperatures ranging from about 10° C. to about 200° C., although at times both higher and lower temperatures may be advantageously employed, the upper temperature generally being limited by the boiling points of the solvent used and the pressures generated within the reactor.

Although the pressure employed in the reaction is not critical, and may range from as low as atmospheric pressure up to 500 p.s.i. and even higher, it is preferred that the pressure be maintained between about 10 p.s.i. and 100 p.s.i. and more preferably between 20 p.s.i. and 50 p.s.i. during the reaction when gaseous reactants are used; otherwise, atmospheric pressure is preferred.

With respect to the proportions of reactants, it generally is desirable to employ at least a stoichiometric amount of a terminal bromide compound to react with the active hydrogen compound, i.e., a molar ratio of terminal bromide compound: active hydrogen compound of at least about 1:1, although at times a greater amount of active hydrogen compound may advantageously be employed, e.g., 1.2 to 2.0 mol per 1.0 mol of terminal bromide.

As mentioned heretofore, the bromine may be recovered from the aqueous phase and recycled and reused in the hydrobromination step. The aqueous phase containing the hydrogen bromide salt may be recovered by the addition of a strong acid such as, for instance, sulfuric acid, phosphoric acid and the like. The hydrogen bromide formed can be separated by distillation, and if desired, returned to the process to form a brominated α-olefin. The treatment of the aqueous phase is preferably conducted at a temperature from about 0° C. to about 40° C., and more preferably from about 10° C. to about 40° C.

It has also been found that the aqueous phase containing the hydrogen bromide salt may be treated with gaseous chlorine to release the bromine which may be subsequently reacted with hydrogen to yield hydrogen bromide and recycled to form a brominated α-olefin. In the treatment of the aqueous phase, the bromide solution is first adjusted to a pH in the range of from 2 to 5, preferably from 2 to 4 and more preferably about 3, and heated to a temperature of from about 30° C. to 40° C. Chlorine gas is contacted with the heated solution and the temperature increased until bromine distills over from the reaction media. The bromine gas recovered therefrom is subsequently reacted with hydrogen in any conventional manner known to the art to form hydrogen bromide which may be subsequently recycled to form brominated α-olefins.

The following examples are illustrative of our invention; however, it is to be understood that the invention is not to be limited to these examples.

Example I

Two grams of lauroyl peroxide (0.005 mol) were dissolved in 84 grams (0.5 mol) of dodecene-1 (95 percent straight chain olefin content) at room temperature. The mixture was cooled to about 4° C. and anhydrous hydrogen bromide gas was bubbled therethrough with agitation. After a reaction period of 3½ hours at a temperature of from 3 to 9° C., 45.3 grams of hydrogen bromide (0.56 mol) were absorbed. Analysis of the sample for bromide content after neutralizing the dissolved hydrogen bromide with sodium bicarbonate indicated 32.4 percent (theoretical 32.2 percent).

Example II

Two hundred and sixty-four grams of a crude bromide product (obtained from a $C_{13}$ α-olefin) and 100 grams of 99 percent isopropanol were treated with dimethyl amine at a pressure of from 20 to 160 mm. (mercury) pressure with agitation at a temperature in the range of from 26 to 52° C. A total of 201 grams of dimethyl amine was absorbed. As the reaction proceeded, some of the dimethyl amine hydrobromide precipitated out. At the end of a two-hour reaction period, a small excess of 25 percent sodium hydroxide was added to the reaction media to neutralize the salt followed by distillation of the isopropanol solvent. The remaining organic material was then separated from the aqueous phase, dried and distilled. Approximately 158 grams of tridecyldimethylamine were obtained.

Example III

In a continuous process, an α-olefin was fed via gas diffusers into the upper end of a cylindrical water-jacketed column and a mixture of hydrogen bromide and air was introduced simultaneously at the base of said column at a temperature of from 0 to 10° C. The molar ratio of hydrogen bromide to olefin feed was 1.0 to 1.5:1. The product collected at the bottom of the column at the end of three hours' operation consisted essentially of a primary alkyl bromide. Approximately 1494 grams of n-dodecyl bromide (6.0 mols) obtained from the continuous reaction of dodecene-1 and hydrogen bromide and 280 grams of sodium hydroxide (7 mols) were dissolved in 460 grams of water and charged into a one-gallon stainless steel reactor. The reaction mixture was cooled and dimethyl amine gas was introduced at a pressure of from 30 to 35 p.s.i.g. over a period of 30 minutes. The temperature during the addition period was maintained between 20 and 25° C. The temperature of the reaction medium was increased to 150° C. at such a rate as to keep the internal pressure at approximately 50 p.s.i.g. The reaction was maintained at a temperature of approximately 150° C. for a period of four hours, after which time the system was cooled and 300 grams of water were added, and the temperature of the reaction mixture was then adjusted to 70° C. The organic upper layer was separated for distillation purposes and the lower layer containing the sodium bromide was retained for future bromine recovery. Distillation of the organic upper layer through a 60 cm. packed column yielded 1107 grams of a product boiling at a temperature of from between 145 to 150° C. at 20 mm. (mercury) pressure. Analysis of the product obtained from the distillation by titration with acid indicated a minimum purity of 95 percent dodecyl dimethyl amine.

Example IV

The bromide solution recovered in Examples II and III was acidified to a pH of approximately 3 and heated to a temperature of about 40° C. Chlorine gas was slowly introduced into the solution as the temperature was gradually increased to about 60° C. The bromine recovered by distillation was purified and reacted with hydrogen to form hydrogen bromide.

Example V

Approximately 1810 grams of a crude bromide product (mixture $C_7$, $C_8$ and $C_9$ from corresponding α-olefins), 440 grams of sodium hydroxide, 1320 grams of water and 348 grams of 40 percent aqueous monomethylamine were charged into a stainless steel reactor. The system was closed and the mixture was agitated for 2 hours at 15–17° C., then the temperature was raised to room temperature and maintained for an additional 2 hours. At the end of this 2 hour period, the reactants were heated to about 150° C. under pressure and maintained at this temperature for a period of approximately 3 hours. At the end of this reaction period, the reactants were cooled and the upper organic layer was separated and distilled through a packed column at 20 mm. pressure. Approximately 683 grams of dialkyl ($C_7$, $C_8$, $C_9$) methylamine was recovered. Analysis of a sample of this material by titration with acid indicated a 96.8 percent amine content.

Example VI

Approximately 1332 grams of a $C_{16}$, $C_{18}$ and $C_{20}$ mixed bromide from the corresponding olefin, 137.5 grams of monoethanol-amine and 165.6 grams of sodium hydroxide in 655.4 grams of isopropanol were heated to reflux temperature with agitation and maintained at this temperature for a period of about 12 hours. At the end of the reaction period the warm reaction mixture was washed with approximately 150 grams water, followed by separation of the organic layer. Approximately 1845 grams of material was recovered which solidified on cooling. By analysis, it was determined that the material was a dialkyl ($C_{16}$, $C_{18}$, $C_{20}$) ethanolamine.

Example VII

Approximately 150 grams of n-butanol and 32.6 grams (0.39 mols) sodium sulfhydrate flakes (70%) were added to a one liter reactor fitted with an agitator, reflux condenser, dropping funnel and thermometer. The mixture was agitated and heated while hydrogen sulfide was bubbled therethrough at a minimum rate. When the temperature reached approximately 60° C., at which point the sodium sulfhydrate liquified, 88.8 grams (0.35 mol) of α-olefin bromide containing 86.1 percent primary bromide, 12.6 percent secondary bromide and 1.3 percent olefin were added dropwise over a period of 10 minutes, and then stirred for approximately 1.5 hours during which time hydrogen sulfide was passed through the reactants while maintaining the temperature at 60° C. The addition of hydrogen sulfide was terminated and the reaction mixture was refluxed for an additional 1 hour, after which time 100 grams of water were added to the cooled reaction mixture to dissolve the solid materials. After the reaction media separated into two layers, the organic layer was recovered and distilled through a vigreux column. Approximately 145 grams of solvent, about 4.2 grams of a forecut, and about 56 grams of a main cut were recovered from the distillation of the organic layer. Analysis of the distillation products indicated that the forecut contained mostly olefin material, whereas the main cut contained 0.1 percent bromine and 97.2 percent n-dodecylmercaptan. This amounted to approximately 90 percent yield of mercaptan based on the amount of primary bromide employed in the reaction.

Other primary functional derivatives have been prepared by the reaction of brominated α-olefin with other active hydrogen compounds such as ammonia, methylmercaptans, thiophenols, hydrogen cyanide, methanol, ethanol and the like.

We have found a unique process which involves a combination of steps for preparing primary functional derivatives by reacting an α-olefin with hydrogen bromide to yield a brominated terminal hydrocarbon which will then react with an active hydrogen compound to yield the primary functional derivative and a hydrogen bromide salt. The hydrogen bromide salt is subsequently treated to yield hydrogen bromide which is recycled to the α-olefin treating step and reused in the hydrobromination of the α-olefin. Thus from the standpoint of economics, we have provided a process for producing primary functional derivatives which heretofore was prohibitive. Furthermore, we have provided a cyclic process for the preparing of primary functional derivatives which is both practical and capable of being conducted on an industrial scale with relatively simple apparatus and equipment.

While there is disclosed above but a limited number of embodiments of the invention herein presented, it is possible to produce still other embodiments, without departing from the inventive concept herein disclosed, and it is desired, therefore, that only such limitations be imposed on the appended claims as are herein stated.

What is claimed is:

1. A process for the production of an amine comprising the steps of contacting a terminal olefin having from 6 to 40 carbon atoms per molecule with hydrogen bromide in the presence of a free radical producing catalyst to produce a terminal bromide, reacting the terminal bromide in the liquid phase with an active hydrogen compound selected from the group having the formula $RNH_2$, $R_2NH$, and $NH_3$, wherein R is an aromatic group, an alkyl group of from 1 to 3 carbon atoms or hydroxy alkyls or ethers thereof in the presence of a base to produce the amine and a hydrogen bromide salt, separating the amine from the hydrogen bromide salt, treating the hydrogen bromide salt with a chlorine to release the bromide, thereafter reacting the bromine with hydrogen to form hydrogen bromide, recycling the hydrogen bromide to the first step for reuse in the formation of further amounts of the terminal bromide.

2. The process as claimed in claim 1 in which the catalyst is an organic peroxide.

3. The process as claimed in claim 1 in which the active hydrogen compound is methylamine.

4. The process as claimed in claim 1 in which the active hydrogen compound is diethylamine.

5. A process for the production of an amine comprising the steps of contacting a terminal olefin having from 6 to 40 carbon atoms per molecule with hydrogen bromide at a temperature of from 0° C. to 40° C. in the presence of a free radical producing catalyst, reacting the teminal bromide in the liquid phase with an active hydrogen compound selected from the group having the formula $RNH_2$, $R_2NH$, and $NH_3$, wherein R is an aromatic group, an alkyl group of from 1 to 3 carbon atoms or hydroxy alkyls or ethers thereof at a temperature of from 20° C. to 150° C. in the presence of a base to produce the amine and a hydrogen bromide salt, separating the amine from the hydrogen bromide salt, treating the hydrogen bromide salt with gaseous chlorine at a temperature of from 40° C. to 60° C. to release the bromine, thereafter reacting the bromine with hydrogen to form hydrogen bromide, recycling the hydrogen bromide to the first step for reuse in the formation of further amounts of the terminal bromide.

6. The process as claimed in claim 5 in which the base is an alkali metal hydroxide.

7. The process as claimed in claim 5 in which the base is an alkaline earth hydroxide.

8. The process as claimed in claim 1 in which the base is a tertiary amine.

9. The process as claimed in claim 5 in which the mol ratio of hydrogen bromide to terminal olefin is in the range of from 1.0 to 1.5:1.

10. In a process for the production of an amine comprising the steps of contacting a terminal olefin having from 6 to 40 carbon atoms per molecule with hydrogen bromide in the presence of a free radical producing catalyst to produce a terminal bromide, reacting the terminal bromide in the liquid phase with an active hydrogen compound selected from the group having the formula $RNH_2$, $R_2NH$, and $NH_3$, wherein R is an aromatic group, an alkyl group of from 1 to 3 carbon atoms or hydroxy alkyls or ethers thereof in the presence of a base to produce the amine and a hydrogen bromide salt, and separating the amine from the hydrogen bromide salt, the improvement comprising contacting the hydrogen bromide salt with a chlorine to release the bromine and thereafter reacting the bromine with hydrogen to form hydrogen bromine.

11. The process as claimed in claim 10, in which the hydrogen bromide is recycled to the first step for reuse in the formation of further amounts of terminal bromide.

References Cited
UNITED STATES PATENTS 2,078,582  4/1937  Nafash _____ 260—585

OTHER REFERENCES

Groggins, Unit Processes in Organic Synthesis, McGraw-Hill, New York, 1958, pp. 259 and 260.

CHARLES B. PARKER, *Primary Examiner.*

R. L. RAYMOND, *Assistant Examiner.*